United States Patent [19]

Macharg

[11] 3,927,361
[45] Dec. 16, 1975

[54] BATTERY CHARGERS

[76] Inventor: James Adrian Macharg, 16, Elmfield Park, Gosforth, Newcastle Upon Tyne, 3, England

[22] Filed: Jan. 21, 1971

[21] Appl. No.: 108,317

Related U.S. Application Data

[63] Continuation-in-part of Ser. No. 827,182, May 23, 1969, Pat. No. 3,624,481.

[30] Foreign Application Priority Data

Jan. 27, 1970  United Kingdom............. 400170/70

[52] U.S. Cl................... 320/39; 320/23; 323/22 T
[51] Int. Cl.$^2$ .......................................... H02J 7/10
[58] Field of Search........... 320/35, 36 TD, 36 SCR, 320/39, 40, 21, 22, 23, 24; 323/22 T

[56] References Cited
UNITED STATES PATENTS

| | | | |
|---|---|---|---|
| 3,453,519 | 7/1969 | Hunter, Jr........................ | 320/39 X |
| 3,517,293 | 6/1970 | Burkett et al..................... | 320/39 X |
| 3,517,295 | 6/1970 | Lapuyade ......................... | 320/39 X |
| 3,590,358 | 6/1971 | Ruben................................ | 320/39 |

Primary Examiner—J. D. Miller
Assistant Examiner—Robert J. Hickey
Attorney, Agent, or Firm—Toren, McGeady and Stanger

[57] ABSTRACT

A battery charger for use in charging secondary batteries in order to avoid the undesired effects caused by overcharging, wherein the battery terminal voltage is compared with a reference voltage which is variable between upper and lower limits, the result of the comparison switching "on" and "off" control circuitry in accordance with the sensed difference between the reference voltage and the battery terminal voltage, the control circuitry causing an increase or decrease of charging current between two given limits the lower of which may be zero, and a corresponding increase or decrease in the reference voltage in accordance with the ON/OFF ratio of the control circuitry, the ON/-OFF ratio itself being continually modified as charging progresses so as to gradually reduce the average charging current.

21 Claims, 9 Drawing Figures

BATTERY CHARGERS

CROSS REFERENCE

This application is a continuation-in-part of my application Ser. No. 827,182, filed May 23, 1969, now U.S. Pat. No. 3,624,481, issued Nov. 30, 1971.

FIELD OF THE INVENTION

Application Ser. No. 827,182 provides a battery charger including means for deriving a reference voltage, means for varying the value of the reference voltage in accordance with the state of charge of the battery, means for comparing the reference voltage with the actual voltage of the battery being charged, and means operable from said comparator means to switch off the charging current when the battery voltage reaches the reference voltage and to switch on the charging current when the battery voltage falls below the reference voltage, whereby the state of charge of the battery is continually sensed during charging and the ON/OFF ratio of the charging current is continually modified as charging progresses to thereby control the charging current.

In the simplest form the circuit includes a reference voltage circuit for passing a controlled current through a reference resistor, a voltage comparator device which will compare the voltage across the reference resistor with the terminal voltage of the battery being charged. In this way the charging current to the battery is switched off and on in accordance with the difference between the two voltages supplied to the comparator device.

Application Ser. No. 827,182 also includes embodiments in which the reference voltage is controlled by utilizing a. the ON/OFF ratio produced by the switching on and off of the charging current when the terminal voltage of the battery drops below and reaches, respectively the reference voltage, so as to reduce the latter gradually as charging proceeds, and b. the comparison of the length of the "off" time with the time taken for a capacitor to discharge, thereby deciding the instant at which the reference voltage is dropped to a lower level in order to terminate the charging period.

SUMMARY OF THE INVENTION

It is an object of the present invention to further improve the operation of the battery charger by utilizing the ON/OFF ratio to control the charging current more smoothly.

It is a further object of the invention to ensure that the charging current must always reduce during the charging cycle thus preventing thermal run-away.

According to the present invention there is provided a battery charger including means for deriving a reference voltage; means for comparing the reference voltage with the actual voltage of the battery being charged; means operable from said comparator means for sensing when the difference between the reference voltage and the battery terminal voltage is above or below a given value; means operable from said sensing means for varying the magnitude of the charging current to the battery between two limits as a function of the sensed difference in voltage; and means for varying the value of the reference voltage between upper and lower limits as a function of the ON/OFF cycle of charging.

The battery charger may additionally include means for integrating the output of the sensing means.

The means for controlling the magnitude of the charging current may be a power stage which is controlled so that the magnitude of charging current it passes to the battery is a function of the voltage applied to the power stage.

The means for varying the magnitude of the charging current may include an integrator and control circuitry operable from the output therefrom to develop a second reference voltage across a load for controlling the power stage.

BRIEF DESCRIPTION OF THE DRAWINGS

The present invention will now be described in greater detail by way of examples with reference to the accompanying drawings, wherein.

DESCRIPTION OF THE PREFERRED EMBODIMENTS

Figure 1:
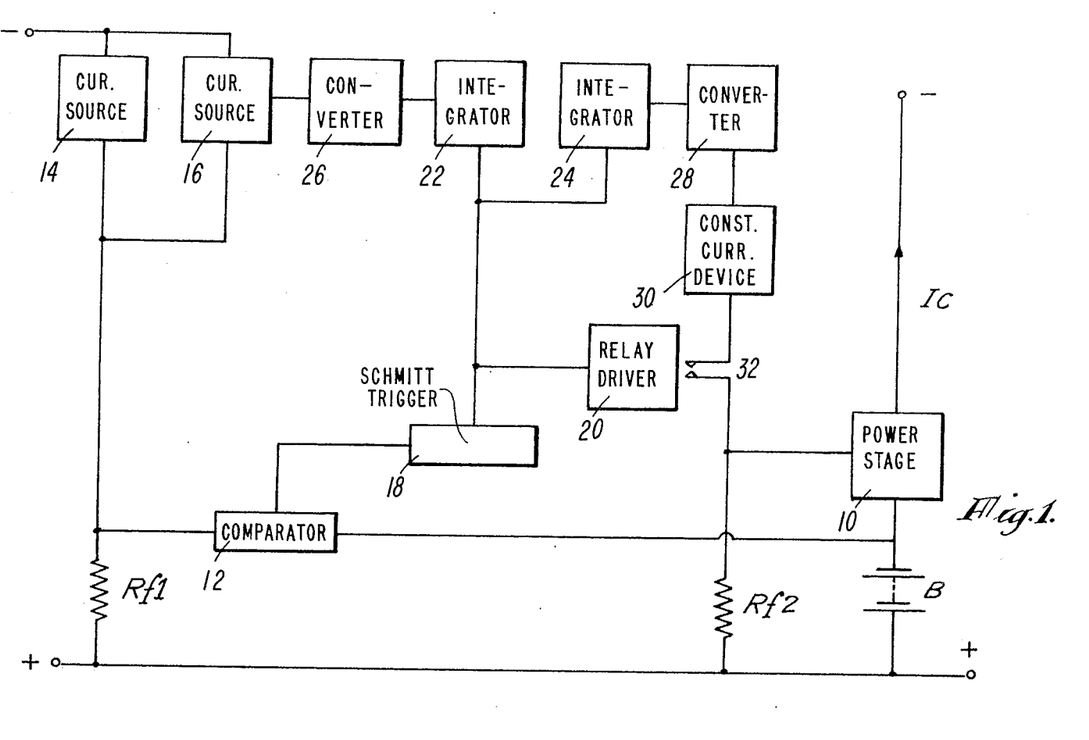
FIG. 1 is a block diagram of a first modified form of battery charger in which a second reference voltage is derived.

Referring to FIG. 1 of the drawings, the battery B is charged by means of a charging current Ic supplied by an external source (not shown). The charging current Ic is supplied to the battery B through a constant potential power stage 10, whose output potential is in turn controlled by the potential existing across a reference resistor Rf2, the precise operation of which will be described later on.

A voltage comparator 12 receives firstly a voltage across a reference resistor Rf1 and secondly the terminal voltage of the battery B being charged. The voltage which is developed across the reference resistor Rf1 is derived by a current supplied from a constant current source 14 which may be augmented by current supplied from a constant current source 16. The output from the voltage comparator 12 is supplied to a Schmitt trigger 18 which controls firstly a relay driver 20, secondly an integrator 22 and thirdly an integrator 24. The output from the integrator 22 is applied to a voltage to current converter 26 whilst the output from the integrator 24 is applied to a volatage to current converter 28. The output from the converter 26 is applied to the constant current source 16, whilst the output from the converter 28 is applied to a constant current device 30 in series with a pair of contacts 32 controlled by the relay driver 20. The relay contacts 32 are in series with the reference resistor Rf2.

The constant current source 14 passes a constant current through the reference resistor Rf1, thus creating a reference voltage E Ref (LOW) which is adjusted to that voltage below which the battery B should not drop, i.e. at which charging should commence. The voltage comparator 12 compares the terminal voltage of the battery B with E Ref (LOW). The voltage comparator 12 is designed to apply a signal to the Schmitt trigger 18 if the battery voltage is above the reference voltage created across the resistor Rf1 in such a way that as the battery voltage drops towards such reference voltage a decreasing signal is applied to the Schmitt trigger 18. The Schmitt trigger is a level controlled switch having backlash. When the battery voltage is dropping the Schmitt trigger 18 is in the "off" state until the terminal voltage of the battery has fallen to such a level that the signal from the comparator 12 reaches a lower level at which the Schmitt trigger 18 is switched on. At this point in time the relay driver 20 is energized to close its contacts 32. At the same time the integrators 22 and 24 start to integrate the steady "on" signal from the Schmitt trigger. The integrator 24 has the shorter time constant so that its output rises more quickly than that of the integrator 22. The convertor 26 then converts the voltage output from the integrator 22 into a current which in turn is limited by the constant current source 16. The current which then flows from the constant current source 16 augments the current from the source 14 to raise the reference voltage across the resistor Rf1 to a new level E Ref (HIGH). The "on" state of the charger is then confirmed by the increase of relative difference in levels of the reference voltage and the battery voltage.

In similar fashion the convertor 28 converts the voltage output from the integrator 24 into a current which is in turn limited by the constant current device 30. The current which flows from the constant current device 30 then builds up a voltage across the reference resistor Rf2. As soon as the volatage across the resistor Rf2 reaches a sufficient value, the power stage is switched on, and charging current is permitted to flow, increasing greatly in value with further increase in voltage across the resistor Rf2, reaching a maximum when said voltage reaches a maximum value.

A general explanation of the operation of the control circuitry of the battery charger, will be more clearly understood with reference to FIGS. 5A, 5B and 5C which respectively show graphical illustrations of a battery on charge, firstly when early on in the charging cycle, i.e. when the Schmitt trigger first switches off — this occurring when the battery is about 75% charged, secondly about ½ hour later on when the battery is about 90% charged at a point where the terminal voltage starts to fall slightly, and thirdly when nearly fully charged. Provided that the battery terminal voltage exceeds the reference voltage by an amount of x volts the charger is in the "off" condition. Let us take the case of a battery whose terminal voltage is less than $x$ volts above E Ref (LOW). When connected to the battery charger circuitry at time $t1$ the Schmitt trigger 18 is immediately switched "on" and the reference voltage rises to E Ref (HIGH) as shown by the curve $y$. At the same time a voltage is developed across the reference resistor Rf2 to cause the switching on of the charging current so that the battery terminal voltage follows the curve $z$. At time $t2$ the reference voltage reaches E Ref (HIGH) and remains at this level until the Schmitt trigger switches "off". At time $t3$ the battery terminal voltage has greatly increased beyond the amount of $x$ volts higher than the voltage E Ref (HIGH) so that the Schmitt trigger is switched "off". The length of the first "on" period i.e. $t1 - t3$ may last for about 90 minutes. After the Schmitt trigger switches off, both the reference voltage and the battery terminal voltage decay, but the battery voltage decays at a faster rate. At time $t4$ the critical value of $x$ volts difference between the reference voltage and the battery terminal voltage will be reached at which the Schmitt trigger will switch "on" and the process is repeated. It will be noted that since the battery terminal voltage is decaying at a faster rate than the reference voltate, switch "on" will occur before the reference voltage reaches E Ref (LOW). Charging again continues to time $t5$. The period $t3$ to $t4$ is the "off" period whilst $t4$ to $t5$ is the "on" period, the ON/OFF ratio being considerably greater than unity at this stage in the charging cycle.

Figure 5A:
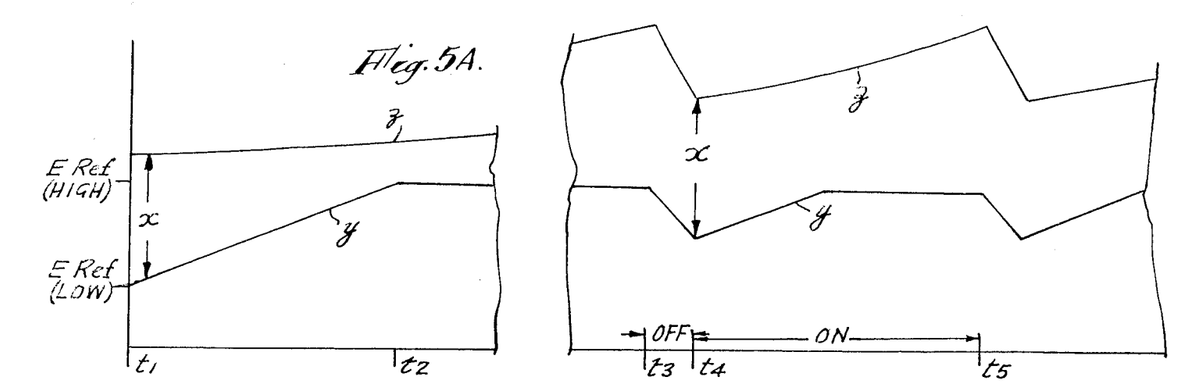
FIGS. 5A, 5B and 5C are graphical illustrations showing the reference voltage and battery terminal voltage plotted against time for a battery on charge.
Figure 5B:
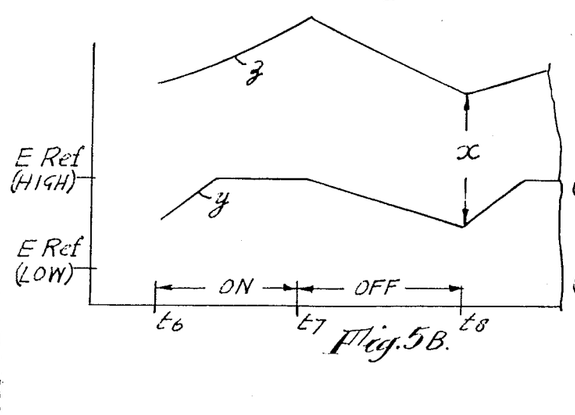

Referring now to FIG. 5B which shows the shape of the two curves $y$ and $z$ at a period when the battery is further charged, it will be seen that the battery voltage rises fairly rapidly during an "on" period and decays more slowly during an "off" period than in FIG. 5A. At this stage in the charging cycle the ON/OFF ratio as determined by the periods $t6 - t7 / t7 - t8$ becomes about unity. It should be noted that the reference voltage does not fall to E Ref (LOW) during the "off" period and only remains at E Ref (HIGH) for a comparatively short time.

Figure 5C:
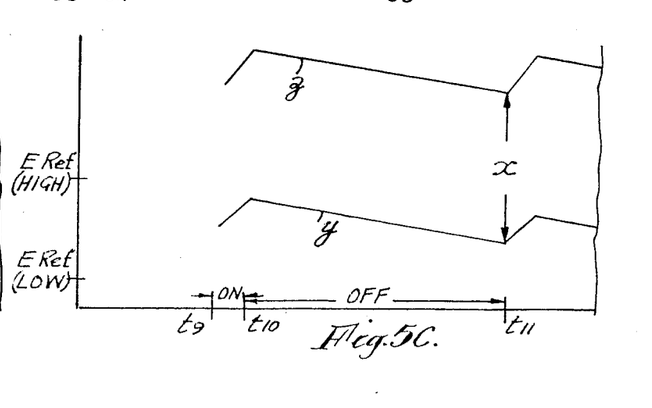

Referring now to FIG. 5C, which shows the shape of the two curves $y$ and $z$ at a period when the battery is nearly fully charged, it will be seen that the two curves are tending to approach one another in shape and that the reference voltage oscillates between upper and lower limits which are respectively lower and higher than E Ref (HIGH) and E Ref (LOW). Due to the fact that the ON/OFF ratio has been considerably reduced, the integrated voltage is lower on the decay curve of the integrating capacitor. This means that the rate of charge is quicker and the rate of decay slower. Also the voltage across the integrating capacitor has been reduced to such a value that the voltage to current converter 26 is incapable of supplying the maximum current which the second constant current source 16 is designed to pass. Hence the maximum value of the reference voltage is reduced below E Ref (HIGH). The reference voltage thus rises quickly towards E Ref (HIGH) when the Schmitt trigger switches on, but falls only very slowly when the Schmitt trigger switches off. The reference voltage thus oscillates between voltage limits which are respectively lower than and higher than E Ref (HIGH) and E Ref (LOW).

Referring again to FIG. 1, the battery is charged as long as the difference between the terminal voltage and the reference voltage is large enough to keep the signal which is applied to the Schmitt trigger 18 below the level at which the Schmitt trigger will switch off. When the difference between the two voltages decreases to such an extent that the voltage comparator signal has risen to the level at which the Schmitt trigger will switch off, it will do so thus de-energizing the relay driver 20, which opens the contacts 32, also removing the steady state signal from the two integrators 22 and 24. The outputs from the integrators then begin to decay, effecting respectively a gradual reduction in voltage across the reference resistors Rƒ1 and Rƒ2, but also a sudden collapse to zero of the voltage across the resistor Rƒ2 in view of the open circuit presented by the opening of the contacts 32, said open circuit so reducing rapidly the charging current which is already reducing in magnitude.

Since the battery will not be fully charged during the first "on" period of the Schmitt trigger, its terminal voltage will quickly settle to a value lower than that at the end of the charge period. The rate of drop will be quicker than the rate of drop of the voltage across the reference resistor Rƒ1 from E Ref (HIGH) towards E Ref (LOW). This means that as the terminal voltage across the battery is decaying the gap between the terminal voltage and the voltage across the reference resistor Rƒ1 is increasing with the result that the signal to the Schmitt trigger is decreasing again. Thus before the reference voltage has fallen to E Ref (LOW) the Schmitt trigger will be switched on again and the cycle is repeated. At this stage in the charging cycle the "on" period is relatively long and the "off" period relatively short in comparison. The charging cycle keeps repeating as described above, the length of the "off" period increasing with respect to the "on" period. However, each successive cycle tends to give a reduction in the ON/OFF ratio and hence a reduction in the average charging current.

Figure 2:
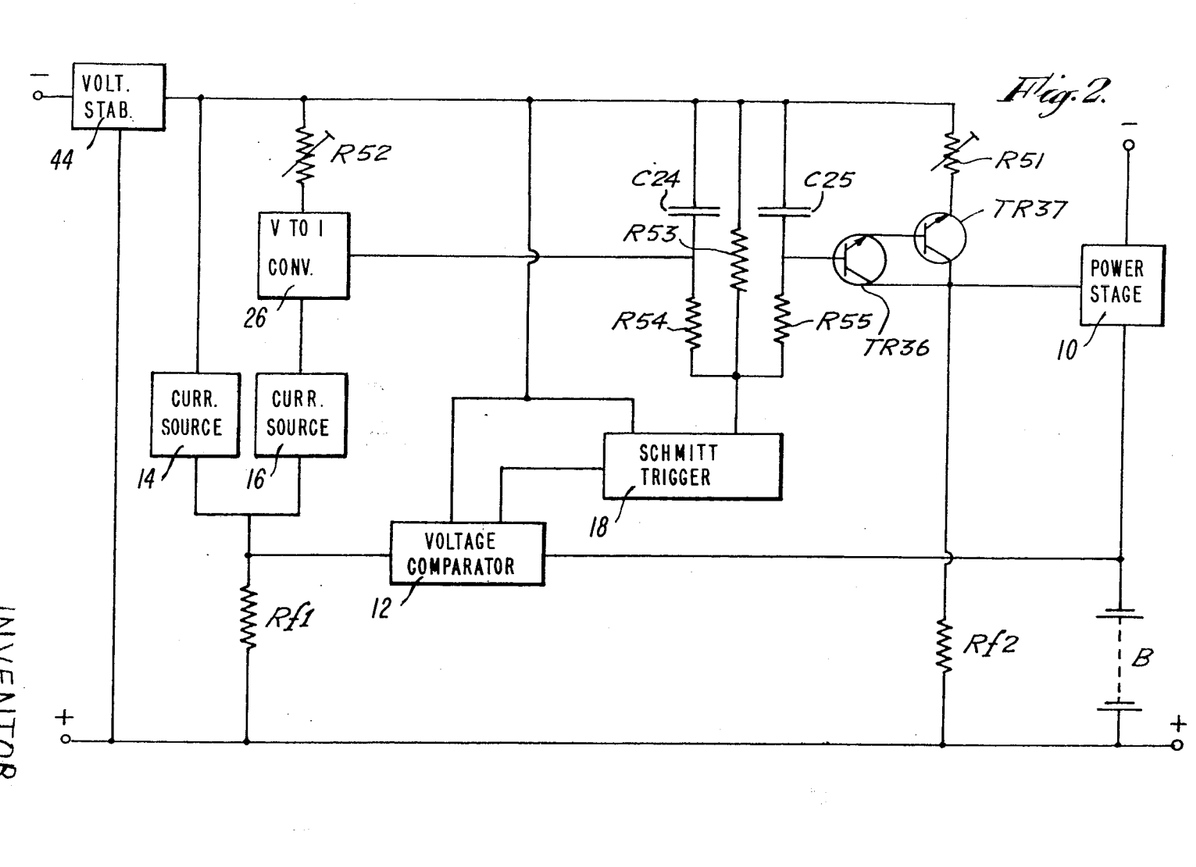
FIG. 2 is a block diagram of a first modified form of battery charger in which the relay driver is omitted.

Referring now to FIG. 2, the modification over the circuit shown in FIG. 1 includes the elimination of the relay driver and associated contacts through which the second reference voltage becomes established when the Schmitt trigger is switched on. The circuit also shows the two integrators 22 and 24 in greater detail.

The integrator 22 comprises a resistor R54 and a capacitor C24 connected in series between the output from the Schmitt trigger 18 and the negative rail of the supply for the control circuitry supplied through a voltage stabilizer 44. The junction between the resistor R54 and the capacitor C24 is connected to the converter 26 which receives its supply from the negative rail through a preset resistor R52. The capacitor C24 will thus charge and discharge in accordance with the ON/OFF ratio of the charging cycle. During the early stages of charging the voltage across the capacitor C24 is high relative to its maximum so producing a slow charge and a rapid discharge, whereas towards the final stages of charging the voltage across the capacitor is very much less than its maximum resulting in a rapid charge and a slow discharge.

The integrator 24 comprises a resistor R55 and a capacitor C25 connected in series between the output from the Schmitt trigger 18 and the negative rail of the supply in parallel with the components comprising the integrator 22. The junction between the resistor R55 and the capacitor C25 is connected to the base electrode of a transistor TR36 comprising the first stage of a darlington pair which also includes a transistor TR37. The emitter electrode of the transistor TR37 is connected to the negative rail through a preset variable resistor R51. The collector electrodes of the transistors TR36 and TR37 are connected to the power stage 10 to control the amount of charging current flowing to the battery B. The reference resistor Rƒ2 is connected between the positive rail and the commoned collector electrodes of the darlington pair TR36 and TR37. The components comprising the two integrators 22 and 24 are connected across a resistor R53 which is the load of the Schmitt trigger.

The operation of the modified circuit is the same as that shown in FIG. 1 except for what happens after the integrator 24. When the Schmitt trigger 18 is switched on the voltage across the capacitors C24 and C25 of the respective integrators starts to build up. Due to the different time constants of the two integrators the voltage across the capacitor C24 rises at the slower rate than that across the capacitor C25. The darlington pair TR36 and TR37 is conducting a small current whilst the Schmitt trigger 18 is "off". As the voltage across the capacitor builds up the darlington pair conducts more current so causing the second reference voltage to build up across the resistor Rƒ2. The voltage across the reference resistor Rƒ2 controls the power stage 10 which in turn controls the amount of charging current flowing to the battery B in accordance with the value of the second reference voltage. When the Schmitt trigger 18 switches off, the darlington pair TR36 and TR37 remains on thus maintaining the flow of charging current to the battery B, its value reducing as the integrated voltage across the capacitor C25 reduces. The charging current Ic is flowing all the time, the actual value being controlled by the value of the second reference voltage which in turn is controlled by the amount of current flowing through the darlington pair, which in turn is controlled by the operation of the integrator.

Figure 3A:
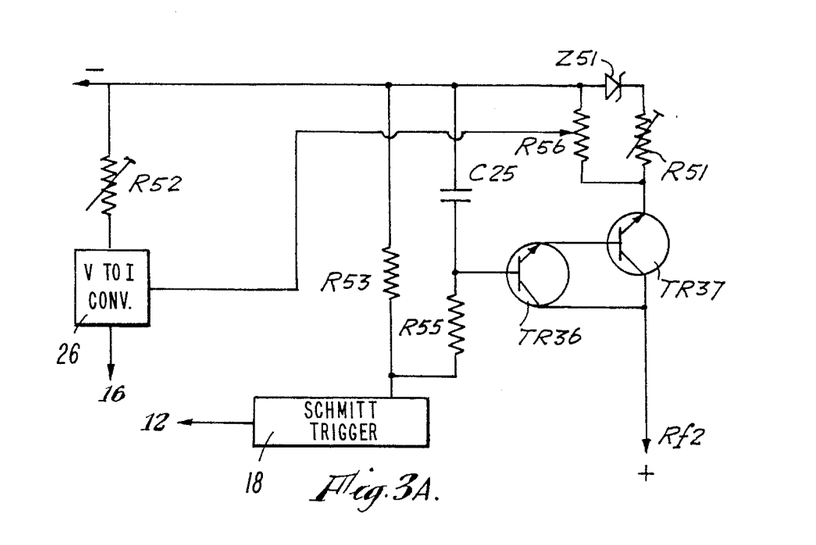
FIGS. 3A and 3B are part block diagrams of second and third modified forms of battery charger in which one integrator is omitted and the control for reference voltage complex is obtained from the charging current complex.

Referring to FIG. 3A, the second modification over the circuit shown in FIG. 1 includes the omission of the voltage integrator 22. Instead the voltage which is applied to the converter 26 is obtained from the tap of a potentiometer R56 in parallel with the resistor R51. A zener diode Z51 is in series with the resistor R51. The circuit is otherwise identical with that shown in FIG. 2.

Figure 3B:
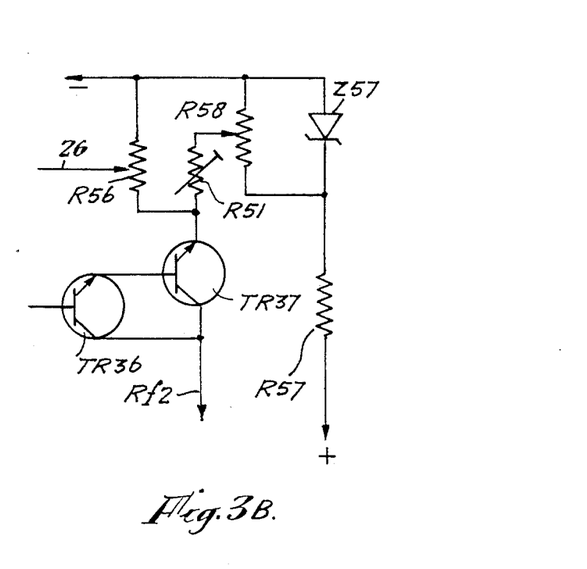

Referring to FIG. 3B, the third modification over the circuit shown in FIG. 1 again includes the omission of the voltage integrator 22. As in FIG. 3A, the voltage which is applied to the converter 26 is obtained from the potentiometer R56. A zener diode Z57 is connected in series with a resistor R57 across the voltage supply to the control circuitry. A potentiometer R58 is connected across the zener diode Z57, the tap of this potentiometer being connected to the negative side of the potentiometer R51 which is in series with the darlington pair.

Whereas in the embodiments of FIGS. 1 and 2, one relied on the difference in the time constants produced by the voltage and current complexes, in order to ensure a satisfactory operation of the charger and a gradual reduction of the ON/OFF ratio and average charging current as the charging cycle progressed, in the case of the embodiments of FIGS. 3A and 3B there must be some means of controlling the relative gains of the voltage and current complexes in order to achieve the same effect.

In the case of FIG. 3A, the voltage for the control of the voltage to current converter 26 is obtained across the potentiometer. The voltage at the positive end of this potentiometer will be the integrated voltage across the capacitor C25 minus the combined base-emitter voltages across the transistors of the darlington pair. The zener diode Z51 conducts as long as there is sufficient voltage across it. Early on in the charging cycle the voltage across the capacitor C25 is a maximum hence there is sufficient voltage at the emitter electrode of the transistor TR37 to maintain the zener diode in conduction, and hence maximum current flows through the darlington pair and the reference resistor Rƒ2 to maintain the value of the charging current at a high average value. As the integrated voltage across the capacitor C25 reduces as charging progresses a point is reached at which the zener diode ceases to conduct, and the current flow for the reference resistor must pass through the potentiometer R56 which as a high value of resistance. Therefore the current through the reference resistor Rf2 is greatly reduced which results in a reduction of the average charging current. This has the effect of increasing the gain of the current complex.

The same effect can be achieved in the case of FIG. 3B, except that the off-set provided in the emitter path of the darlington pair is made adjustable. In this case the zener diode Z57 and the potentiometer R58 are fed from the positive rail throught the resistor R57 and the negative end of R51 is connected to the tap of the potentiometer R58 in order to provide the said variable off-set. As the battery becomes more fully charged, the integrated voltage reflected to the base-emitter electrodes of the darlington pair is reduced in similar fashion to that in FIG. 3A.

Figure 4:
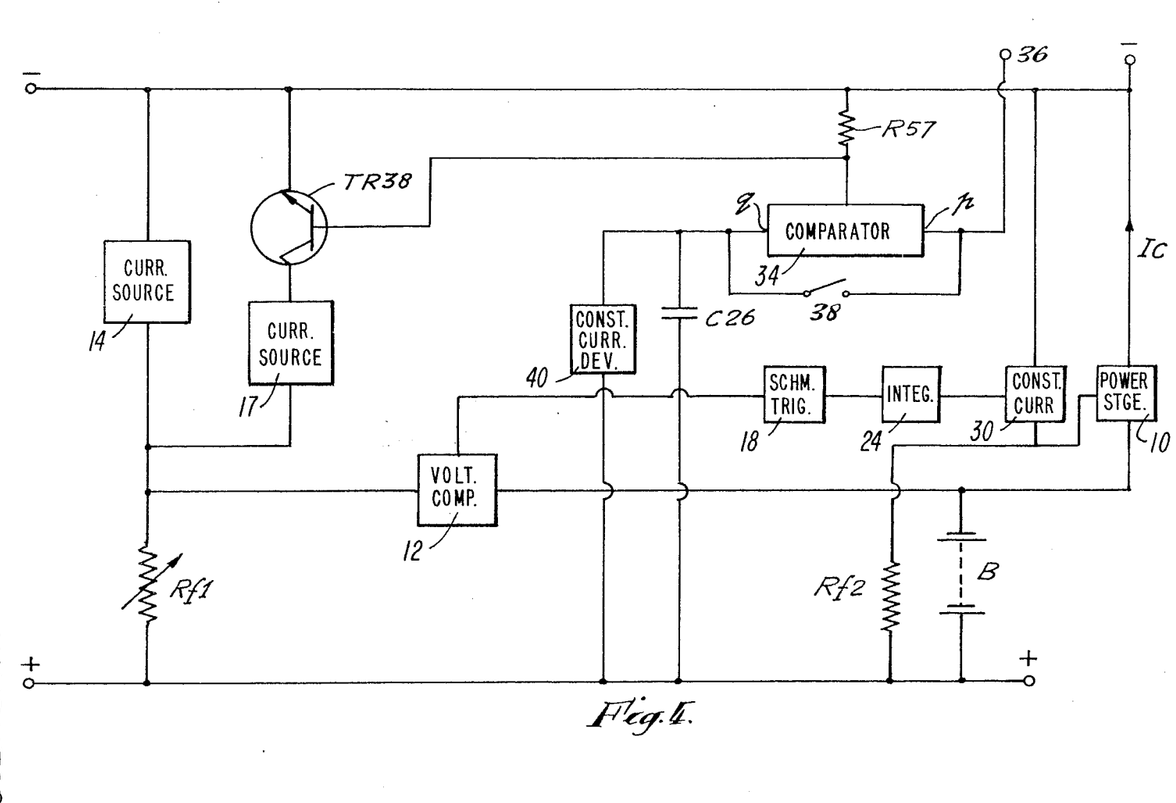
FIG. 4 is a block diagram of a second form of battery charger in which the average charging current is sensed and its rate of drop compared with a predetermined rate of drop for varying the first reference voltage.

Referring to FIG. 4 of the drawings, the battery B is supplied with charging current through a constant potential power stage 10 as in the previous embodiments. The reference voltage is derived across a resistor Rf1, and is compared with the actual terminal voltage of the battery by means of a comparator circuit 12, the output from which is applied to a Schmitt trigger 18. The output from the Schmitt trigger 18 is connected to an integrator 24 which in turn controls a constant current device 30 and hence the voltage which is developed across a second reference resistor Rf2.

The voltage across the reference resistor Rf1 is supplied from a first and second constant current sources as before only the source 14 being shown for the sake of clarity. The reference voltage developed across the reference resistor Rf1 is also augmented by current supplied from a third constant current source 17 in the form of a "ring-of-two". A transistor TR38 is connected in series with the constant current source 17 to act as a switch. When the base-emitter voltage of the transistor TR38 is high enough for the transistor to conduct, the current from the constant current source 14 is augmented by the current from the constant current source 17 to provide a higher reference voltage across the resistor Rf1. When the transistor TR38 is cut-off, only the current from the constant current source 14 flows in the resistor Rf1, so providing a lower reference voltage.

The voltage which causes the conduction of the transistor TR38 is derived from a comparator block 34. This comparator 34 has two inputs denoted by the letters $p$ and $q$. The first input p is connected to a terminal 36 on which there is induced a voltage which is proportional to the charging current. This voltage may be obtained from any point in the charging circuit by any known means. The second input $q$ is supplied from the voltage across a capacitor C26. This capacitor C26 is charged up to the same voltage on the terminal 36 when a switch 38 is closed. When the switch 38 is opened the capacitor C26 discharges at a linear rate through a constant curren device 40. The switch 38 is arranged to be closed for a period long enough to charge the capacitor C26 and to be opened for a period long enough for the comparison operation to take place. The switch 38 may be automatically opened and closed by any suitable means either mechanical such as a driven rotary switch or electronic such as a multivibrator. The comparator 34 receives its supply from the negative rail of the supply through a resistor R57.

During the initial stages of charging, i.e. when the battery is in a nearly discharged condition, the length of the "on" periods are relatively long compared with the "off" periods. During this time, the magnitude of the charging current falls off at a relatively constant fast rate. Thus every time the switch 38 closes and opens again, the comparator 34 supplies a voltage to the base electrode of the transistor TR38, since the rate of reduction in voltage at the input $p$ is greater than the rate of drop in voltage at the input $q$ due to the capacitor C26 discharging through the constant current device 40. Under these conditions the reference voltage across the resistor Rf1 is maintained at its higher value thus tending to keep the ON/OFF ratio in a condition where the "on" period is as long relative to the "off" period as battery conditions will allow.

If the rate of voltage drop at the terminal 36 goes below a predetermined minimum rate of drop, i.e. the voltage at the terminal 36 is tending towards becoming a constant value, then the rate of decay of the voltage across the capacitor C26 discharging into the constant current devie 40, is greater than the rate of drop at the terminal 36, i.e. input q reduces at a faster rate than input $p$. Under these conditions, the comparator 34 operates to block the transistor TR38 and switch off the constant current source 16 which has the effect of reducing the reference voltage to its lower value and so reducing the "on" period in relation to the "off" period. The reference voltage is maintained at this lower level until the rate of drop of the voltage at the input $p$ exceeds the predetermined minimum rate of drop as determined by the linear rate of voltage decay at the input $q$, whereupon the comparator 34 switches on the transistor TR38 again.

The reason for the repeating sequence of equalization and comparison is that the rate of reduction of charging current is usually reducing rather than linear. Furthermore, the function is variable according to many circumstances, an important one being the state of charge of the cells at the commencement of charging. Thus it is essential to repeatedly sample the rate of current reduction.

Figure 6:
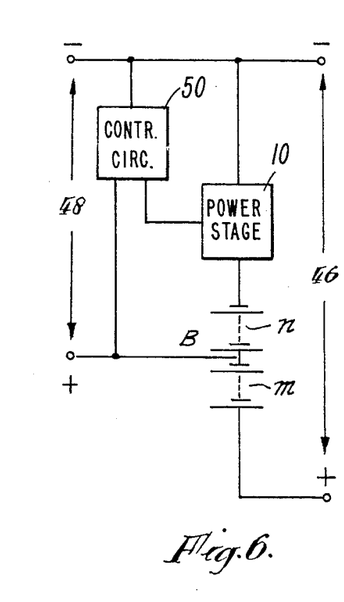
FIG. 6 is a block diagram illustrating how a high voltage battery may be charged by the charger of any one of FIGS. 1 to 4.

Referring now to FIG. 6, in a modified form where it is desired to control the charging of a battery of many cells, having a terminal voltage which is very much higher than the supply voltage to the control circuits, in order to keep the control circuitry more or less standarized, and to obviate the use of many high-voltage transistors which are currently expensive, a convenient number of cells $n$ at the negative end of the battery B would still be used in the position shown in the circuitry disclosed. The remainder of the cells $m$ in the battery would be connected by their final positive terminal to the positive terminal of a suitably high power supply 46 which would supply the charging current. Such supply would have its negative terminal connected directly to the negative terminal of the low-voltage supply 48 of the control circuitry 50. Alternatively a potential divider may be connected across the battery, the tap being adjusted to provide an average voltage to that of a suitably small number of cells.

With either of the above means, no significant alteration to the control circuitry is necessary, by sampling the condition of the battery from the number of cells effectively connected between the terminals of the supply of the control circuitry.

In a further modified form of the battery charger for the purpose of supplying higher charging current, the controlled constant potential power stage 10 in any one of FIGS. 1 to 4 is a phase-controlled thyristor output stage having one or more thyristors, being an electronically controlled switch or relay. The control voltage generated across the reference resistor R/2 would be arranged to control the firing angle of the thyristor output stage in such a way that when said control voltage is reduced the said firing angle is increased, thus reducing the current transfer into the battery. Whilst by its very nature such thyristor output stage provides an ON/OFF ratio, the latter will be repeating at twice the AC mains frequency assuming full wave rectification and it may not be convenient to use an ON/OFF ratio of such high frequency for control purposes. The battery may be allowed to integrate this ON/OFF ratio by its natural smoothing action and a longer time sample may be utilized by methods previously described in the parent patent. Standard modules may thus still be utilized for the sensing of the battery state if a phase control thyristor output stage were to be used.

In a further modified form of the battery charger the inherent ON/OFF ratio of the thyristor output stage may be utilized for control of the charging current in the following manner.

As previously disclosed, the terminal voltage of the battery on charge is compared with the reference voltage by using a comparator whose output is integrated by a capacitative network, which integrated voltage output is used directly or indirectly by amplification to control the firing angle of the thyristor output stage. Since a direct relationship exists between the said firing angle (ON/OFF ratio) and the control voltage, said control voltage may be used also to control the reference voltage in such a way that as charging proceeds and the charging current drops, so the reference voltage is gradually lowered in turn by the dropping control voltage. Further, when the control voltage (and hence the charging current) drops to a predetermined value, the reference voltage may be caused to drop to the value of E Ref (LOW) as previously disclosed. It is important to note that in this further modified form, during the charging period the voltage across the said capacitative network is gradually decaying. More than this, it is decaying during each "off" period and termination of charge is still effected by whether its rate of decay is faster than that of the terminal voltage of the battery.

What I claim and desire to secure by Letters Patent is:

1. A battery charger, comprising reference means for deriving a reference voltage; comparator means for comparing the reference voltage with the actual voltage of the battery being charged; sensing means operable from said comparator means for sensing when the difference between the reference voltage and the battery terminal voltage is above or below a given value, said sensing means producing either a zero signal or a signal of a given value according to the result of the comparison between the reference voltage and the battery terminal voltage; integrator means operable from the output of the sensing means; battery charging circuit means; current control means in the battery charging circuit means, for varying the magnitude of the charging current as a function of the integrated output from said integrator means; reference voltage varying means responding to said integrator means for varying the value of the reference voltage between predetermined upper and lower limits as a function of the integrated output from the integrator means.

2. A battery charger as in claim 1, wherein said current control means turn the current on and off in response to said integrating means, whereby the charging current is cycled on and off in accordance with the state of charge of the battery.

3. A battery charger comprising reference means for deriving a reference voltage; comparator means for comparing the reference voltage with the actual voltage of the battery being charged; sensing means operable from said comparator means for sensing when the difference between the reference voltage and the battery terminal voltage is above or below a given value, said sensing means producing either a zero signal or a signal of a given value according to the result of the comparison between the reference voltage and the battery terminal voltage; integrator means operable from the output of the sensing means; battery charging circuit means; current control means in the battery charging circuit means for varying the magnitude of the charing current as a function of the integrated output from said integrator means; reference voltage varying means responding to said integrator means for varying the value of the reference voltage between predetermined upper and lower limits as a function of the integrator output from the integrator means; said control voltage means including a voltage to current converter connected to and operable from the output of the integrator means; said battery charging means including a current limiting device connected to and operable from the output of the voltage the the current converter, a load connected in series with the output of the current limiting device across which a control voltage is developed; the charging current control means being controlled by the control voltage developed across said load so that the magnitude of charging current which the control means passes to the battery is a function of the integrated voltage from the sensing means.

4. A battery charger according to claim 3, wherein said current control means includes a realy operable from the sensing means, said relay having a pair of contacts in series with the output from the current limiting device so that the contacts are closed when the integrator means starts in response to an output from the sensing means and opened when the integrator means is stopped when the output from the sensing means is zero, so that the charging current is cycled between zero and a magnitude determined by the voltage developed across the load during the time that the integrator means is switched on through the sensing means due to said voltage comparison.

5. A battery according to claim 3, wherein said integrator means comprises a capacitor and resistor in series, said capacitor being charged up exponentially during the time that the sensing means produces a signal at the given value and being discharged exponentially during the time in the cycle that the sensing means produces a zero signal.

6. A battery charger comprising reference means for deriving a reference voltage; comparator means for comparing the reference voltage with the actual voltage of the battery being charged; sensing means operable from said comparator means for sensing when the difference between the reference voltage and the battery terminal voltage is above or below a given value, said sensing means producing either a zero signal or a signal of a given value according to the result of the comparison between the reference voltage and the battery terminal voltage; integrator means operable from the output of the sensing means; battery charging circuit means; current control means in the battery charging circuit means; for varying the magnitude of the charging current as a function of the integrated output from said integrator means; reference voltage varying means responding to said integrator means for varying the value of tfhe reference voltage between predetermined upper and lower limits as a function of the integrated output from the integrator means, the means for deriving the variable reference voltage comprising a constant current source; a resistor across which the reference voltage is developed by the current from the constant current source; a limited current source to augment the current through the resistor; means for controlling said constant current from the output of the intergrator measn so as to cyclically raise and lower the reference voltage progressively between said upper and lower limits in accordance with the output from said sensing means which is cyclically switched from zero to said given value in accordance with the state of charge of the battery.

7. A battery charger according to claim 6, wherein said integrator means comprises first and second resistor-capacitance integrators operable from the sensing means; said charger including control circuitry operable from the output of the first integrator; a resistor across which a control voltage is developed from the second integrator in order to control the current control means; said second integrator having a longer time constant than the first integrator and controlling the progressive variation of the control voltage between the upper and lower limits through the limited current source.

8. A battery charger according to claim 6, including a darlington transistor pair, the state of conduction of which is controlled from the output of the integrator means; a resistor across which a control voltage is developed through current passing through the darlington pair; the control voltage controlling the current control means; a potentiometer connected in series with the emitter-collector paths of the darlington pair, said potentiometer having a tap connected to the limited current source so as to achieve the progressive variation of the first reference voltage between the upper and lower limits.

9. A battery charger according to claim 6, including a darlington transistor pair, the state of conduction of which is controlled from the output of the integrator means; said current control means including a power stage; a resistor across which a control voltage is developed through current passing through the darlington pair, said control voltage being utilized to control the charging current passing through the power stage; a parallel circuit comprising in one arm a potentiometer and in the other arm a preset variable resistor and a zener diode, said parallel circuit being connected in series with the emitter paths of the darlington pair, said potentiometer having a tap connected to the second limited current source whereby a fraction of the integrated output from the integrator means is utilized to effect the progressive variation of the reference voltage between said upper and lower limits.

10. A battery charger according to claim 6, including a darlington transistor pair, a capacitor and resistor in series, together constituting the integrator means, connected across a load resistor forming part of the output circuit of a Schmitt trigger constituting the sensing means, the base electrode of the first ransistor of the darlington pair being connected to the junction between the capacitor and resistor; a potentiometer in series with the emitter collector paths of the darlington pair, said potentiometer having a tap connected directly to the second limited current source; a load resistor in series with the darlington pair across which a control voltage is developed due to the controlled integrated output from the Schmitt trigger, said second reference voltage controlling the quantity of charging current permitted to flow to the battery according to the integrated output of the Schmitt trigger between two levels, the variation of the first reference voltage between said upper and lower limits in conjunction with the terminal voltage of the battery causing the Schmitt trigger to cyclically switch on and off, the ratio of "on" to "off" gradually decreasing as charging progresses.

11. A battery charger according to claim 10, including additional stabilizing and control circuitry associated with the darlington pair, said circuitry including a zener diode and a resistor in series across the series arrangement of the potentiometer, darlington pair and load resistor across which the control voltage is developed; a second potentiometer across the zener diode the tap of which is connected to one end of a preset variable resistor, the other end of which is connected to the emitter electrode of the second transistor of the darlington pair.

12. A battery charger comprising a constant current source; a resistor connected to said constant current source and across which a basic reference voltage is developed by the current flow in the constant current source; a limited current source in parallel with the constant current source; means for controlling the current flow in said limited current source from zero up to a given value so as to vary the reference voltage developed across the resistor between a lower level and an upper level; comparator means for comparing the value of the reference voltage with the terminal voltage of the battery on charge; a level controlled switch having back-lash, said switch being controlled from the output of said comparator means and producing either a zero signal or a signal of a given value according to whether it is "off" or "on"; integrator means operable from the output of the level controlled switch; means for deriving a second reference voltage from the integrated output of the level controlled switch; power stage means for charging the battery and for controlling the magnitude of the charging current thereof, said power stage means being controlled as a function of the second reference voltage, the current flow in the limited current source also being connected to be controlled as a function of the integrated output from the level controlled switch so as to continuously cycle the charging current between maximum and minimum values during charging in accordance with the state of charge of the battery.

13. A battery charger according to claim 12, for charging a battery has a large number of cells in series, wherein the voltage which supplies the two constant current sources in order to develop the first reference voltage and which also supplies the rest of the control circuitry is effectively connected across $n$ cells of the battery to be charged at the negative end so that the cyclic charging of the battery in accordance with its charge state as provided by the level controlled switch is determined solely with respct to these $n$ cells regardless of the state of charge of the other $m$ cells at the positive end of the battery, the charging current passing through all the cells $n$ and $m$.

14. A battery charger, comprising means for deriving a reference voltage; means for comparing the reference voltage with the actual voltage of the battery being charged; means operable from said comparator means for sensing when the difference between the reference voltage and the battery terminal voltage is above or below a given value and producing either a zero signal or a signal of a given value in accordance with the results of said voltage comparison; an integrator operable from the output of the sensing means; battery charing circuit means; a current control stage in the battery charging circuit means for controlling the magnitude of the charging current as a fuction of the integrated output from the integrator; reference voltage varying means connected to said reference voltage deriving means for varying the value of the reference voltage between predetermined upper and lower limits; means responsive to said charging circuit means for producing a voltage which is proportional to the charging current; a capacitor which is discharged at a constant rate; means for comparing the reduction in this voltage with the rate of decay of a voltage across said capacitor which is discharged at a constant rate; the reference voltage varying means being actuated by the output from the comparison means so as to raise the reference voltage to the upper limit if the rate of decay of charging current is above a certain value as determined by the comparison, the charging current thereby being cycled on and off in accordance with the state of charge of the battery.

15. A battery charger according to claim 14, including a constant current device through which the capacitor is cyclically discharged; a cyclically operated switch charging said capacitor up to the voltage proportional to the charging current when closed, the comparison between the rates of decay of the voltage proportional to the charging current and that across the capacitor as it discharges through the constant current device being made when the switch is open.

16. A battery charger according to claim 15, including a constant current source and a limited current source arranged in parallel; a resistor across which the reference voltage is developed; a transistor whose emitter-collector path is in series with the limited current source and whose base electrode is controlled to permit the transistor to conduct or remain blocked in accordance with comparison of the reduction of the two voltages.

17. A battery charger according to claim 14, including a resistor; a constant current device whose output is in series with said resistor across which a second reference voltage is developed; a comparator having two inputs respectively receiving the voltage proportional to the rate of decay of the charging current and the rate of fall of voltage across the capacitor; and cylically operated switch means for alternately charging the capacitor to the voltage proportional to the charging current and connecting it to the input of the comparator.

18. A battery charger, comprising means for deriving a reference voltage; means for comparing the reference voltage with the actual voltage of the battery being charged; means operable from said comparator means for sensing when the difference between the reference voltage and the battery terminal voltage is above or below a given value; means operable from said sensing means for varying the magnitude of the charging current to the battery between two limits as a function of the sensed difference in voltage; means for varying the value of the reference voltage between upper and lower limits in a direction that maintains the difference above or below the given value; said means for deriving a reference voltage including a constant current source, a resistor across which the reference voltage is developed by the current from the constant source; said means for varying the value of the reference voltage including a limited current source arranged in parallel with said constant current source to admit the constant current through the resistor, said limited constant current source being responsive to said sensing means so as to raise and lower the reference voltage between the limits in accordance with the output from said sensing means.

19. A battery charger according to claim 18, including a first integrator operable from the sensing means; control circuitry operable from the output of the integrator; a resistor across which a second reference voltage is developed from the integrator; a power stage controlled by the second reference voltage; and a second integrator in parallel with the first integrator, said second integrator having a longer time constant and controlling the progressive variation of the reference voltage between the upper and lower limits through the second constant current source, each integrator including a capacitor and resistor in series.

20. A battery charger according to claim 18, including an integrator operable from the sensing means; control circuitry operable from the output of the integrator; a resistor across which a second reference voltage is developed from the integrator; a power stage controlled by the second reference voltage; a potentiometer connected to said control circuitry having a tap connected to the second constant current source so as to achieve the progressive variation of the reference voltage between the upper and lower limits.

21. A battery charger according to claim 20, wherein means are provided for reducing the current through a load associated with the power stage when said integrated voltage is reduced to a given value.

* * * * *